(12) United States Patent
Hamaoka et al.

(10) Patent No.: US 7,543,091 B2
(45) Date of Patent: Jun. 2, 2009

(54) SELF-ORGANIZED PARALLEL PROCESSING SYSTEM

(75) Inventors: Yoshiyuki Hamaoka, Austin, TX (US); Kazuko Ishibashi, Austin, TX (US); Hiroo Hayashi, Round Rock, TX (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/946,790

(22) Filed: Sep. 22, 2004

(65) Prior Publication Data
US 2006/0075265 A1 Apr. 6, 2006

(51) Int. Cl.
G06F 13/00 (2006.01)
G06F 9/00 (2006.01)
G06F 15/177 (2006.01)
G06F 1/24 (2006.01)

(52) U.S. Cl. .............. 710/104; 713/1; 713/100
(58) Field of Classification Search ................ 710/10, 710/104; 713/1, 2, 100; 709/220, 221; 712/13, 712/15; 718/104
See application file for complete search history.

(56) References Cited

U.S. PATENT DOCUMENTS

| | | | | |
|---|---|---|---|---|
| 5,564,015 A * | 10/1996 | Bunnell | | 714/47 |
| 5,727,208 A * | 3/1998 | Brown | | 713/100 |
| 5,822,531 A * | 10/1998 | Gorczyca et al. | | 709/221 |
| 5,838,603 A * | 11/1998 | Mori et al. | | 365/63 |
| 6,427,163 B1 * | 7/2002 | Arendt et al. | | 709/201 |
| 6,748,429 B1 * | 6/2004 | Talluri et al. | | 709/221 |
| 6,988,211 B2 * | 1/2006 | Cline et al. | | 713/300 |
| 7,039,692 B2 * | 5/2006 | Foster et al. | | 709/221 |
| 7,152,157 B2 * | 12/2006 | Murphy et al. | | 713/100 |
| 2002/0024993 A1 * | 2/2002 | Subramanian et al. | | 375/216 |
| 2002/0133757 A1 * | 9/2002 | Bertram et al. | | 714/47 |

(Continued)

FOREIGN PATENT DOCUMENTS

JP 04-153764 5/1992

(Continued)

OTHER PUBLICATIONS

"Central processing unit". Wikipedia, the Free Encyclopedia. Online Apr. 28, 2007. Retrieved from Internet May 2, 2007. <http://en.wikipedia.org/wiki/Central_processing_unit>.*

(Continued)

*Primary Examiner*—Thomas J Cleary
(74) *Attorney, Agent, or Firm*—Law Offices of Mark L. Berrier

(57) ABSTRACT

Systems and methods for improving the performance of a multimedia processor system by dynamically evaluating the current performance of the system and, if necessary, updating the configurations of the individual processors to improve the performance of the system. One embodiment comprises a method implemented in a multiprocessor system, including evaluating the performance of each of a current set of configuration objects installed on the processors, selecting a preferred set of configuration objects, and replacing one or more of the configuration objects in the current set to conform the current set to the preferred set. The method may evaluate the performance of each configuration object according to user preferences and may select preferred configuration objects according to a selectable strategy that can, for example, favor unification or diversity in the types of preferred configuration objects.

48 Claims, 13 Drawing Sheets

U.S. PATENT DOCUMENTS

| | | | |
|---|---|---|---|
| 2003/0110423 A1* | 6/2003 | Helms et al. | 714/100 |
| 2003/0120914 A1* | 6/2003 | Axnix et al. | 713/100 |
| 2003/0229814 A1* | 12/2003 | Garnett | 713/322 |
| 2004/0049672 A1* | 3/2004 | Nollet et al. | 713/100 |
| 2004/0177245 A1* | 9/2004 | Murphy | 713/100 |
| 2005/0005261 A1* | 1/2005 | Severin | 717/108 |
| 2005/0222969 A1* | 10/2005 | Yip et al. | 707/1 |
| 2006/0015712 A1* | 1/2006 | Ang et al. | 713/100 |

FOREIGN PATENT DOCUMENTS

| | | |
|---|---|---|
| JP | 8-95484 | 4/1996 |
| JP | 9-81022 | 3/1997 |
| JP | 11-202988 | 7/1999 |
| JP | 2003-337712 | 11/2003 |

OTHER PUBLICATIONS

"The American Heritage College Dictionary". Fourth Edition. 2002. Houghton Mifflin Company, p. 111. ISBN 0-618-09848-8.*

Patent Abstracts of Japan. English translation of Publication No. 04-153764 to NEC Corp. Application Publication Date May 27, 1992. Retrieved from Internet Oct. 28, 2008. <http://www19.ipdl.inpit.go.jp/PA1/cgi-bin/PA1DETAIL>.*

Computer Organization and Design, the Hardware/Software Interface, Hennessey and Patterson, Morgan Kaufman Publishers, Inc., 1994, pp. 13-14.

* cited by examiner

SELF-ORGANIZED PARALLEL PROCESSING SYSTEM

BACKGROUND

1. Field of the Invention

The invention relates generally to computer systems and more particularly to systems and methods for enabling dynamic optimization of the configuration of individual processors within a multiprocessor system.

2. Related Art

As computer-related technologies have developed, there has always been a desire for increased speed and processing capacity. These desires are somewhat counterbalanced by a need to reduce the power that is required to provide the increased processing performance.

Various features have been implemented in an effort to achieve increases in performance in these areas. One of the most obvious and straightforward approaches to increasing the computing capabilities of a computer system is to increase the clock speed and the corresponding number of instructions that can be executed by the system. Another, less often implemented approach is to increase the number of processors that are utilized by the computer system. A computer system that uses more than one processor may be referred to as a multiprocessor system.

A multiprocessor computer system may be implemented in a number of ways, but, generally speaking, the goal of a multiprocessor approach is to distribute the program instructions that would have been executed by a single processor in a single-processor system among the two or more processors in the multiprocessor system. By distributing the instructions among the multiple processors, the workload of each processor is reduced, and the number of instructions that can be executed by the computer system in a given amount of time is increased in comparison to a single-processor system.

Multiprocessor systems may be useful in applications such as multimedia applications. For example, some consumer electronics devices are designed to process multimedia data for presentation to a user. This data may include various different types of data, such as WAV audio, MP3 audio, MPEG video, and so on. Multiprocessor systems may also be useful in game systems, which may be required to perform a substantial amount of arithmetic processing in addition to the conversion of the audio and video data to output audio and video signals. Because of the many different types of data that may need to be processed by these systems, it may be useful to configure certain ones of the processors so that they are optimized for processing certain types of data. Some of the processors may therefore perform more optimally than others when the same type of data is being processed by all of the processors. Which ones of the processors perform optimally depends upon the type of data being processed.

In conventional multiprocessor systems, the configuration of each of the processors in the system must be determined when the system is initialized. The configurations of the processors cannot be modified without stopping the system and reinitializing. Thus, it is necessary to determine a single configuration for each of the processors based on the data that is expected to be processed. Typically, the different processors will be configured to perform optimally with several different types of data so that, whatever type of data is being processed, a certain (typically smaller) subset of the processors will perform more optimally, while another (typically larger) subset will perform sub-optimally. The system therefore rarely, if ever, performs optimally with respect to all, or even most, of the processors. The overall sub-optimal performance of the system is manifested in various ways, including reduced processing efficiency (less data is processed) and increased power consumption (more power is required by sub-optimal configurations to process comparable amounts of data.)

There is therefore a need to provide means for improving the performance of multiprocessor systems, both in terms of the processing capabilities of the system, and in terms of the power consumption of the system.

SUMMARY OF THE INVENTION

One or more of the problems outlined above may be solved by the various embodiments of the invention. Broadly speaking, the invention comprises systems and methods for improving the performance of a multimedia processor system by dynamically evaluating the current performance of the system and, if necessary, updating the configurations of the individual processors to improve the performance of the system.

One embodiment comprises a method for improving the performance of a multiprocessor system by evaluating the performance of a current set of configuration objects installed on the processors, selecting a preferred set of configuration objects, and replacing one or more of the configuration objects in the current set to conform the current set to the preferred set. In one embodiment, the evaluation of the configuration objects' performance is based upon user preferences. In one embodiment, the evaluation of the configuration objects' performance is performed using evaluation functions that are associated with specific types of user applications. In one embodiment, the preferred set of configuration objects is selected according to a selectable strategy, such as a unification strategy or a diversity strategy.

In one alternative embodiment, the method may include selecting a first configuration object in the preferred set that has a higher data processing efficiency than a second configuration object in the currently installed set, replacing the second configuration object with the first, and reducing the clock rate at which the corresponding processor is operated in order to reduce the power consumption of the system. In another alternative embodiment, the method may include examining remotely located configuration objects to determine whether they should be included in the preferred set. These configuration objects may, for example, be stored on a server that is accessible through a network that is external to the system. The remotely located configuration objects are evaluated based on performance information stored with these configuration objects. If one of these remotely located configuration objects is selected to replace one of the currently installed configuration objects, the remotely located configuration object is retrieved (e.g., via the external network) and installed on the appropriate processor. In one embodiment, the operation of a processor using a new, unverified configuration object is verified by processing identical data through this processor and a processor using a comparable configuration object and comparing the output data generated by each.

Another embodiment comprises a multiprocessor system including an object manager configured to evaluate performance of a current set of configuration objects installed on the plurality of processors, select a preferred set of configuration objects, and replace one or more of the configuration objects in the current set to conform the current set to the preferred set. Alternative embodiments may include variations similar to those described above in connection with the method embodiments.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
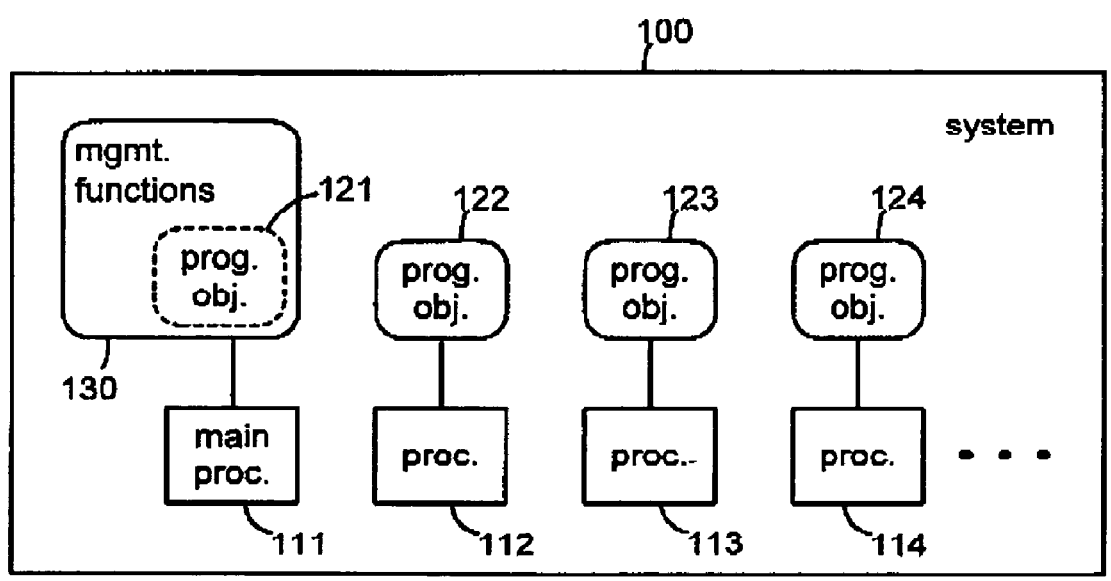
FIG. 1 is a diagram illustrating a typical multiprocessor computing system in accordance with the prior art.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for improving the performance of a multimedia processor system by dynamically evaluating the current performance of the system and, if necessary, updating the configurations of the individual processors to improve the performance of the system. Thus, rather than having to select a single configuration for each processor such that the system performs passably, but not optimally, in processing a variety of different data types, the configuration of each processor can be updated so that the overall system performance is more optimal. The system may thereby achieve greater processing speed, processing quality, power efficiency, thermal efficiency and the like.

One embodiment comprises a method for improving the processing efficiency and power efficiency of a multiprocessor system, including an evaluation process, a selection process and an update process. In other words, the performance of each of a set of configuration objects installed on the processors is evaluated, a preferred set of configuration objects is identified, and one or more of the currently installed configuration objects is replaced with configuration objects of the preferred set, if necessary. The method may include evaluation of the performance of configuration objects according to user preferences and selection of preferred configuration objects according to a selectable strategy that can, for example, favor unification or diversity in the types of preferred configuration objects.

In one alternative embodiment, the method may include selecting a first configuration object in the preferred set that has a higher data processing efficiency than a second configuration object in the currently installed set, replacing the second configuration object with the first, and reducing the clock rate at which the corresponding processor is operated in order to reduce the power consumption of the system. In another alternative embodiment, the method may include examining remotely located configuration objects to determine whether they should be included in the preferred set. These configuration objects may, for example, be stored on a server that is accessible through a network that is external to the system. The remotely located configuration objects are evaluated based on performance information stored with these configuration objects. If one of these remotely located configuration objects is selected to replace one of the currently installed configuration objects, the remotely located configuration object is retrieved (e.g., via the external network) and installed on the appropriate processor. In one embodiment, the operation of a processor using a new, unverified configuration object is verified by processing identical data through this processor and a processor using a comparable configuration object and comparing the output data generated by each. Other alternative embodiments are disclosed herein, and still others will be apparent to those of skill in the art upon reading the present disclosure.

Before describing the various embodiments of the invention, it will be helpful to discuss some aspects of the structure and operation of a conventional multiprocessor system.

Typical Multiprocessor Structure

Referring to FIG. 1, a diagram illustrating a typical multiprocessor computing system is shown. In this figure, system 100 consists of a plurality of individual processors 111-114. While only four processors are depicted in this figure, other systems may have more or fewer processors. Each of processors 112-114 has a corresponding configuration object, 122-124, that configures the processor for execution of a user application. In a typical multiprocessor computer system, there is one processor (e.g., primary processor 111) which executes programming 130 that performs many of the management functions of the computer system, sometimes including configuring or controlling the other processors in the system. After the processors are configured, they may be used to execute the instructions of user applications that are run on the computer system. The primary processor may include programming 121 to execute some of these instructions as well.

In a typical situation, a multiprocessor system may be executing a multimedia user application. For example, the system may be implemented in a DVD movie player. In this application, the multiprocessor system converts stored data into audio and video output signals suitable for driving appropriate speakers and display devices. Each of the processors of the multiprocessor system is configured to retrieve a piece of data from memory, process the data according to the DVD playback application and provide resulting output data. After each processor finishes processing a piece of data, the processor retrieves a new piece of data and processes the new data in the same manner. Each of the processors continues to work in parallel with the others until all of the data is processed.

Each of the processors in a multiprocessor computer system (sometimes excluding the main processor) may be configured identically. In other words, each processor may be configured with the same software, and may process data in exactly the same manner as the other processors. The configuration of the processors may be selected to be optimized for a particular type of data. If other types of data need to be processed, however, the performance of the multiprocessor system may be sub-optimal, because none of the processors are configured specifically to process the other types of data. This problem may be addressed to some extent by configuring one or more of the processors in a different manner. That is, some processors may be configured to process certain types of data, while other processors may be configured to process other types of data. Thus, for any given type of data, there may be a subset of the processors that process the data optimally, while another subset of the processors process the data sub-optimally.

Whatever the configuration of the different processors, this configuration conventionally remains static. In other words, the configuration of each of the processors within the system does not change. There is therefore an initial consideration of the trade-offs between the different configurations and their respective abilities to process the expected data types, and a subsequent decision as to the desired configuration of each processor. If the chosen configurations happen to be less than ideal, then the performance of the computer system is below optimal. Such systems do not allow for the dynamic optimization of the configuration of the processors (i.e., replacement of the current configuration objects with more optimized configuration objects,) or the customization of the system according to a user's preferences.

System Structure

Figure 2:
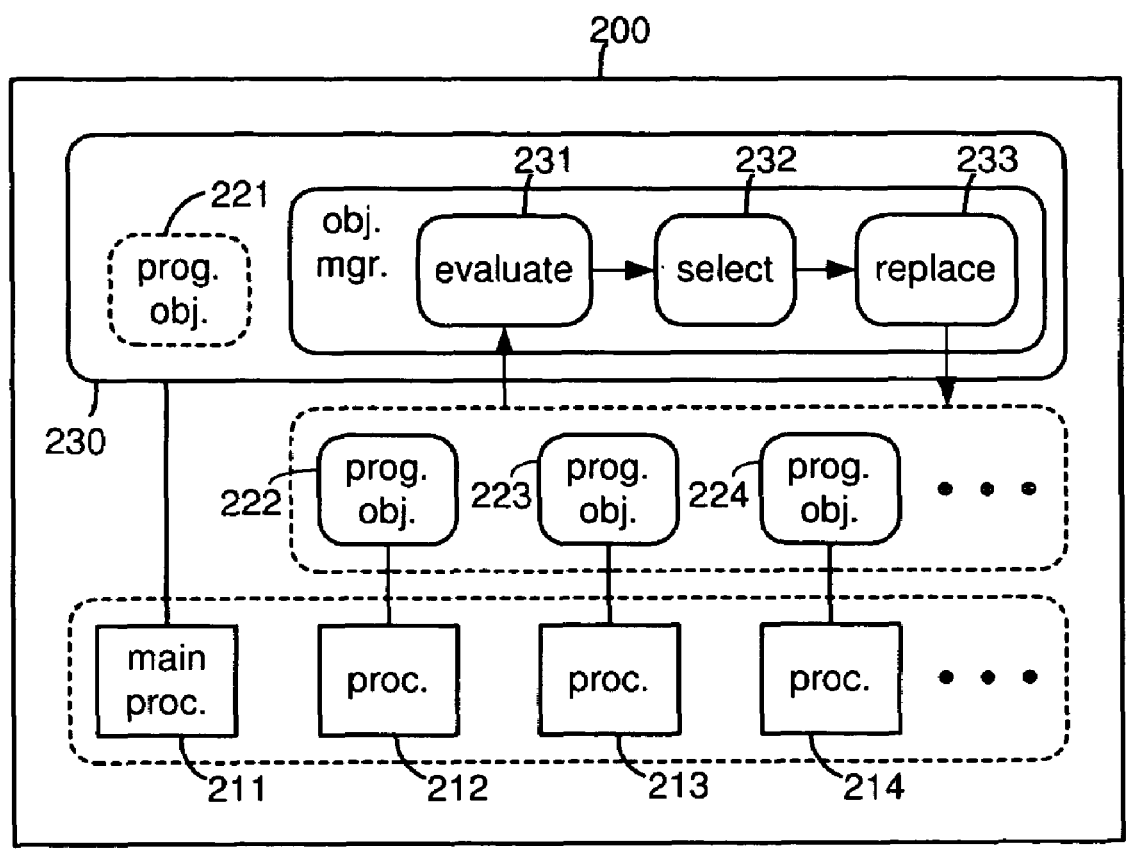
FIG. 2 is a diagram illustrating a multiprocessor computing system in accordance with one embodiment of the invention.

The problem of sub-optimal or non-customizable performance that arises from the static configuration of the individual processors is alleviated in the present embodiment by providing a mechanism to enable the dynamic updating of the individual processors' configurations. Referring to FIG. 2, a diagram illustrating an exemplary embodiment of the invention is shown. In this figure, multiprocessor system 200 includes a plurality of individual processors 211-214, as in other multiprocessor systems. Each of processors 212-214 is configured to use a corresponding one of configuration objects 222-224. Processor 211 may also use a corresponding configuration object 221, but this is not necessarily the case.

It should be noted that "configuration object," as used herein, refers to the programming that is installed on a processor to enable the processor to assist in the execution of a user application. Configuration objects may include, for example, software that processes data according to a particular algorithm, or other configuration information that is used in the processing of data.

In this embodiment, processor 211 is a primary processor that is used to perform management functions within system 200. For example, primary processor 211 is configured in this embodiment to run object manager 230. Object manager 230 provides a mechanism by which configuration objects 222-224 can be dynamically evaluated and, if necessary, replaced to improve the performance of system 200. As shown in FIG. 2, object manager 230 includes an evaluation component 231, a selection component 232 and a replacement component 233.

Evaluation component 231 receives information relating to the performance of processors 212-214, which are using configuration objects 222-224, and evaluates this information to determine the performance of each of these processors. Selection component 232 determines the potential performance that can be achieved by installation of a "preferred" set of configuration objects on processors 212-214. Replacement component 233 then uses the information provided by evaluation and selection components 231 and 232 as the basis for replacing one or more of currently installed configuration objects 222-224 with configuration objects from the preferred set.

Figure 3:
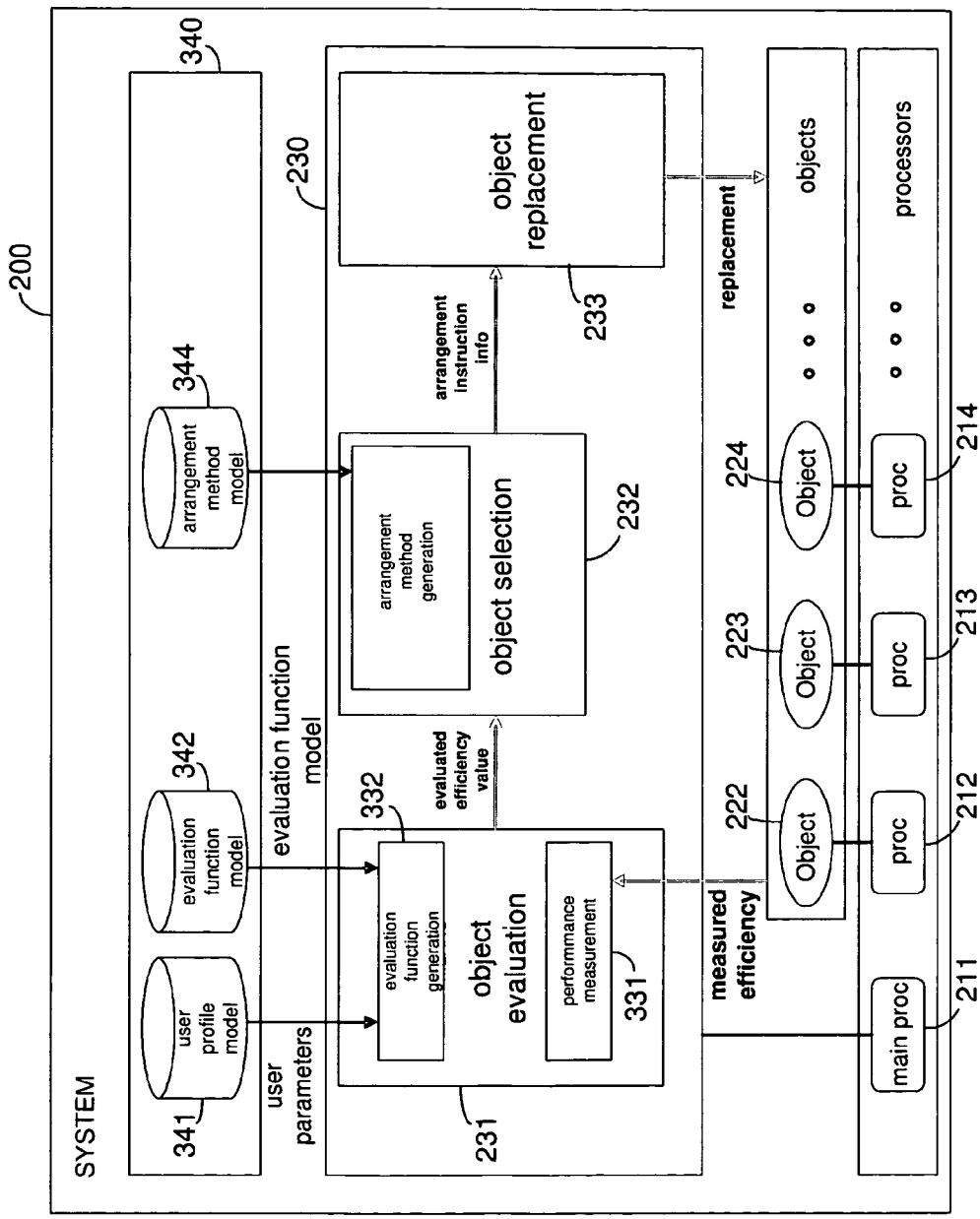
FIG. 3 is a diagram illustrating the interaction of an object manager with configuration objects executing on a multiprocessor computing system in accordance with one embodiment.

Referring to FIG. 3, a diagram illustrating the interaction of an object manager with configuration objects installed on the exemplary multiprocessor computing system of FIG. 2 is shown. FIG. 3 illustrates the interaction between components 231-233 of object manager 230, as well as in the interaction of object manager 230 with processors 222-224 and data sources 340.

When system 200 is initialized, the set of configuration objects 222-224 that are initially installed on processors 212-214 may consist of a "default" set of configuration objects. This default set of configuration objects may be selected in the same manner as configuration objects in the prior art. That is, this set may include a variety of different types of objects, each optimized to process a different type of data. In other embodiments, the default set of configuration objects may consist of any arbitrary selection of objects, as they can be replaced when necessary by other objects.

Configuration Object Evaluation Component

Whichever set of objects is currently being used by processors 212-214, the performance of these objects is determined using a performance measurement component 331 and an evaluation function generation component 332 of object evaluation component 231. Performance measurement component 331 measures some metric associated with the performance of the different objects, 222-224, installed on individual processors 212-214. The particular metric that is used may vary from one embodiment to the next. For example, in one embodiment, the metric may consist of the amount of data that is processed by each individual processor in a given amount of time. In another embodiment, the metric may consist of the amount of power that is used by each processor over a similar interval. Yet another embodiment may use thermal information (i.e. the amount of heat generated by a processor) as a performance metric. Still other embodiments may use other metrics, or combinations of metrics.

The measurement data obtained by performance measurement component 331 is then evaluated by object evaluation component 231. The evaluation is performed using an evaluation function that is provided by evaluation function generation component 332. This evaluation function is based upon one or more functions, weighted according to various user preferences, for evaluating each of the different measured metrics (e.g., one for power efficiency, one for processing capacity, and so on.) The one or more functions upon which the evaluation function is based are retrieved by object evaluation component 231 from evaluation function model storage 342. The user preferences are retrieved from user profile model storage 341. The evaluation of the performance metrics by object evaluation component 231 results, in this embodiment, in the generation of an efficiency value representative of the performance of each of the current configuration objects 222-224 installed on processors 212-214. The measurement and evaluation of the performance of these configuration objects is illustrated in more detail in FIG. 4.

Figure 4:
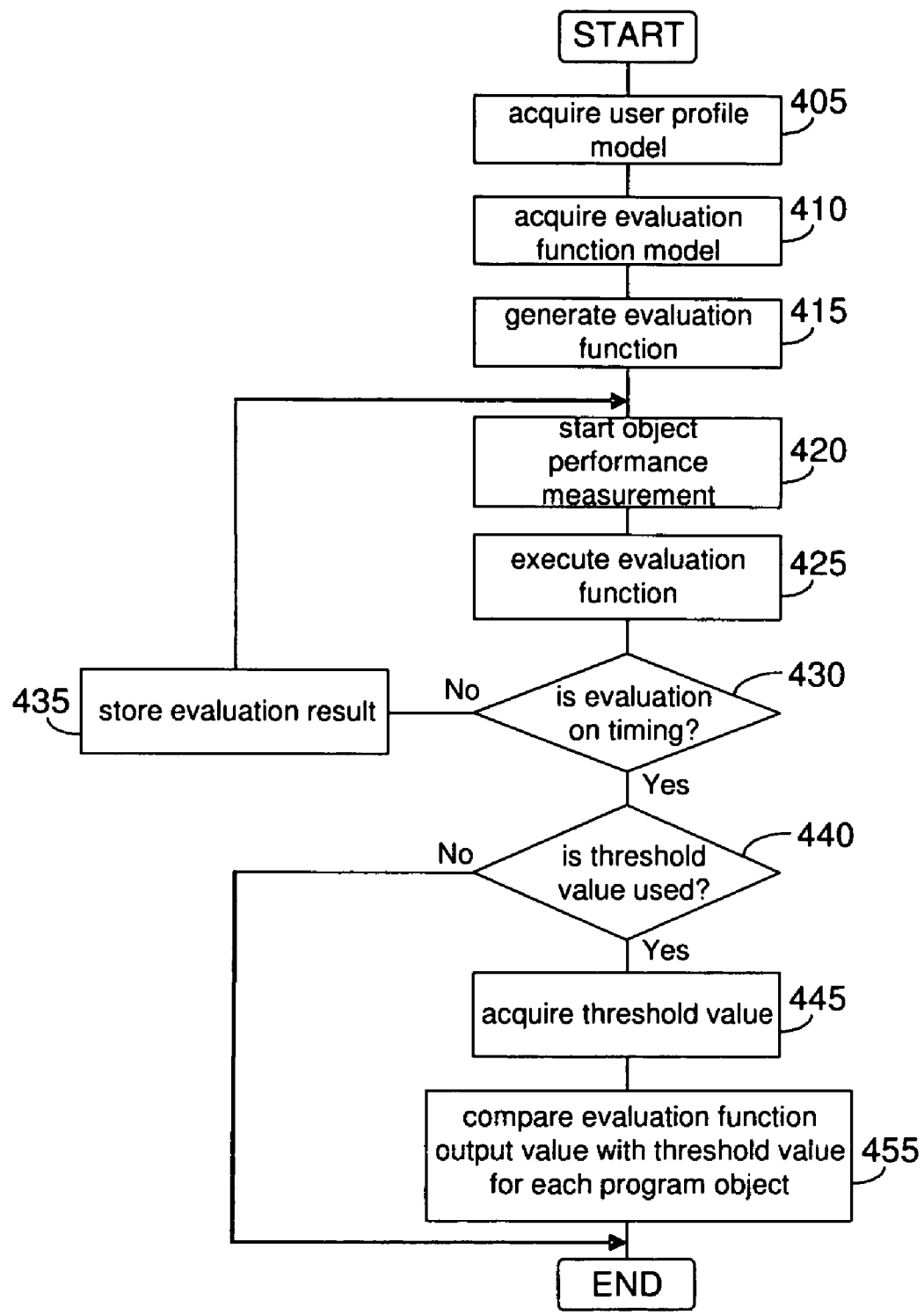
FIG. 4 is a flow diagram illustrating the evaluation of the performance of various configuration objects executing on individual processors in accordance with one embodiment.

Referring to FIG. 4, a flow diagram illustrating the evaluation of the performance of the various configuration objects installed on the individual processors in accordance with one embodiment is shown. It should be noted that, in one embodiment, the method is continually repeated, so that the performance evaluation information is constantly being updated. In other embodiments, this method may be triggered by certain occurrences, such as expiration of a timer that defines the interval between consecutive evaluations of the configuration objects' performance.

As depicted in this figure, the evaluation process begins with the acquisition of a user profile model (block 405) and an evaluation function model (block 410.) The user profile model contains information relating to the preferences of a user with respect to the evaluation of the configuration objects' performance. For example, if the user application that is being executed by the multiprocessor system is an image processing application for still images, image quality may be very important to the user, while processing speed and stability is less important. On the other hand, if the application being executed by the system is a video playback application, the video quality may be slightly less important to the user, while processing speed and stability are more important. The evaluation function model, like the user profile model, is modifiable. Some evaluation function models may be better suited to some types of user applications than to others, so an evaluation function model that is well-suited to the current application is chosen at block 410.

After appropriate user profile and evaluation function models have been acquired, an evaluation function is generated (block 415.) The evaluation function is based upon the selected user profile model and evaluation function model. In one embodiment, the evaluation function model defines the particular manner in which certain measured performance metrics are evaluated (converted from a measured value to an evaluation value.) The evaluation function model may include evaluation function components (sub-functions) based on power consumption, processing speed, output data quality, and so on. The user profile model is used in this embodiment to provide weighting for the different evaluation sub-functions. For example, if image quality is very important to a user but processing speed is not (as indicated by the user profile model,) an evaluation sub-function based on image quality may be heavily weighted, while an evaluation sub-function based on processing speed is not heavily weighted.

After the evaluation function has been generated, performance metrics for the configuration objects currently installed on the processors are measured (block 420.) It should be noted that is not necessary for the evaluation function to be generated before values for the performance metrics are obtained. These functions can be performed in parallel, or in the opposite order. When both the evaluation function and performance measurements are available, the evaluation function can be executed (block 425) to effectively translate the performance measurements into an efficiency value that corresponds to the performance of the currently installed configuration objects.

In the embodiment of FIG. 4, evaluation information for each of the configuration objects is provided to the object selection component at regular intervals. At decision block 430, it is determined whether it is time to provide this information. If it is not time to provide the information to the object selection component, the evaluation information is stored (block 435.) If it is time to provide the evaluation information to the object selection component, the method moves to block 440.

Decision block 440 controls the flow of the process based upon whether or not a performance threshold is implemented. The performance threshold is used as an indicator of acceptable performance of the currently installed configuration objects. If the performance of these configuration objects is above the threshold level, there is no need to replace the configuration objects. If the performance of the configuration objects is below the threshold level, replacement of one or more of the configuration objects is indicated. As depicted in the figure, if a threshold performance value is used, the threshold value is obtained (block 445) and the evaluated performance metric obtained in block 425 is compared to the threshold value (block 455.) If a threshold performance value is not used, the evaluation information is simply provided to the object selection component.

Configuration Object Selection Component

Referring again to FIG. 3, the efficiency value of the currently installed set of configuration objects, 222-224, is provided by object evaluation component 231 to object selection component 232. Object selection component 232 uses this information as the basis for determining which configuration objects are best suited to achieve the desired performance, as defined by the user profile model and evaluation function model. The selection of the preferred set of configuration objects is impacted not only by the user profile model and evaluation function model, but also by an arrangement method model (which is retrieved from arrangement method model storage 344.) The arrangement method model is intended to affect the preferred set as a whole by, for example, maintaining diversification (or, alternatively, homogenization) among the configuration objects in the preferred set. Thus, even if it would improve the overall performance of the system to replace a single configuration object, this replacement may not be desirable if it is contrary to a desired characteristic of the entire set of objects. For example, if a homogeneous set of configuration objects is desired, replacing one of a homogeneous set of configuration objects with a different type of configuration object might not be desirable, even if this slightly improved the overall performance of the system.

Figure 5:
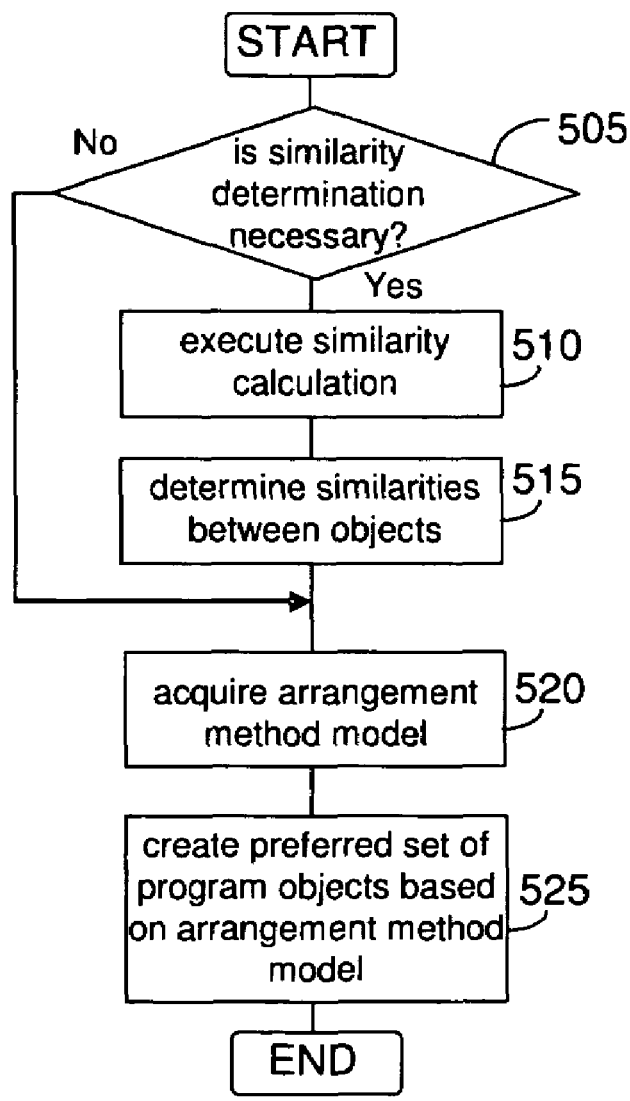
FIG. 5 is a flow diagram illustrating the selection of a preferred set of objects in accordance with one embodiment.

Referring to FIG. 5, a flow diagram illustrating the selection of the preferred set of objects in accordance with one embodiment is shown. In this embodiment, the method begins with a procedure for determining how similar each of the different types of configuration objects are to each other (see blocks 505, 510, 515.) This portion of the object selection method is intended to provide a measure of the similarity or dissimilarity between the different configuration objects in order to enable the identification of a group of preferred configuration objects that exhibit either homogeneity or diversity. This may be desirable for implementing a corresponding configuration object replacement strategy, as will be discussed in more detail below. After the similarity between the various configuration objects has been determined, an arrangement method model is obtained from a corresponding storage 344 (see block 520.) The arrangement method model is intended to implement the replacement strategy, possibly in accordance with the similarity determination. Based upon the arrangement method model, the similarity determination and the evaluation results received from object evaluation component 231, object selection component 232 identifies a preferred set of configuration objects.

As noted above, it may be necessary to determine the similarity of the various configuration objects. It is therefore first determined whether or not this part of the procedure is necessary (block 505.) If it is not necessary to make a similarity determination, the method proceeds directly to the acquisition of the arrangement method model (block 520) and the identification of the preferred set of configuration objects (block 525.) If it is necessary to make a similarity determination, each of the configuration objects is evaluated to provide a basis for comparison (block 510.) In one embodiment, the performance evaluation generated by object evaluation component 231 is used for the comparison. The evaluation information for each of the configuration objects has been compared to that of the other configuration objects, and a metric corresponding to the similarity between each pair of configuration objects is determined (block 515.) This similarity metric is then used in the application of the arrangement method model to identify the preferred set of configuration objects (block 525.)

Configuration Object Replacement Component

Referring again to FIG. 3, object selection component 232 generates arrangement instruction information (i.e., the identification of the preferred set of configuration objects) that is provided to object replacement component 233. In one embodiment, the arrangement instruction information consists of a list of the configuration objects that are available to be installed on the individual processors, along with corresponding values indicating the preferred numbers of each type of configuration object. This information may be in the form of ratios of the configuration objects.

For example, if there are four types of configuration objects (which will be referred to as object A, object B, object C and object D,) the arrangement instruction information may consist of the values 1, 0.5, 0 and 0, corresponding to objects A-D, respectively. Thus, the ratio of the number of configuration objects A to configuration objects B should be 2:1 (1:0.5). Similarly, the ratio of configuration objects A to configuration objects C (or D) should be 1:0. In this scenario, if there are three processors available to the application, it would be preferred to install configuration object A on two of the processors, and configuration object B on one of the processors.

The preferred set of configuration objects can also be identified in terms of percentages instead of ratios. The normalized ratios in the example above (1, 0.5, 0 and 0) are equivalent to the following percentages: 67%; 33%; 0%; and 0%. In other words, to conform to the preferred set, 67% of the processors should execute configuration object A, 33% should execute configuration object B, and none of the processors should execute configuration objects C or D.

Figure 6:
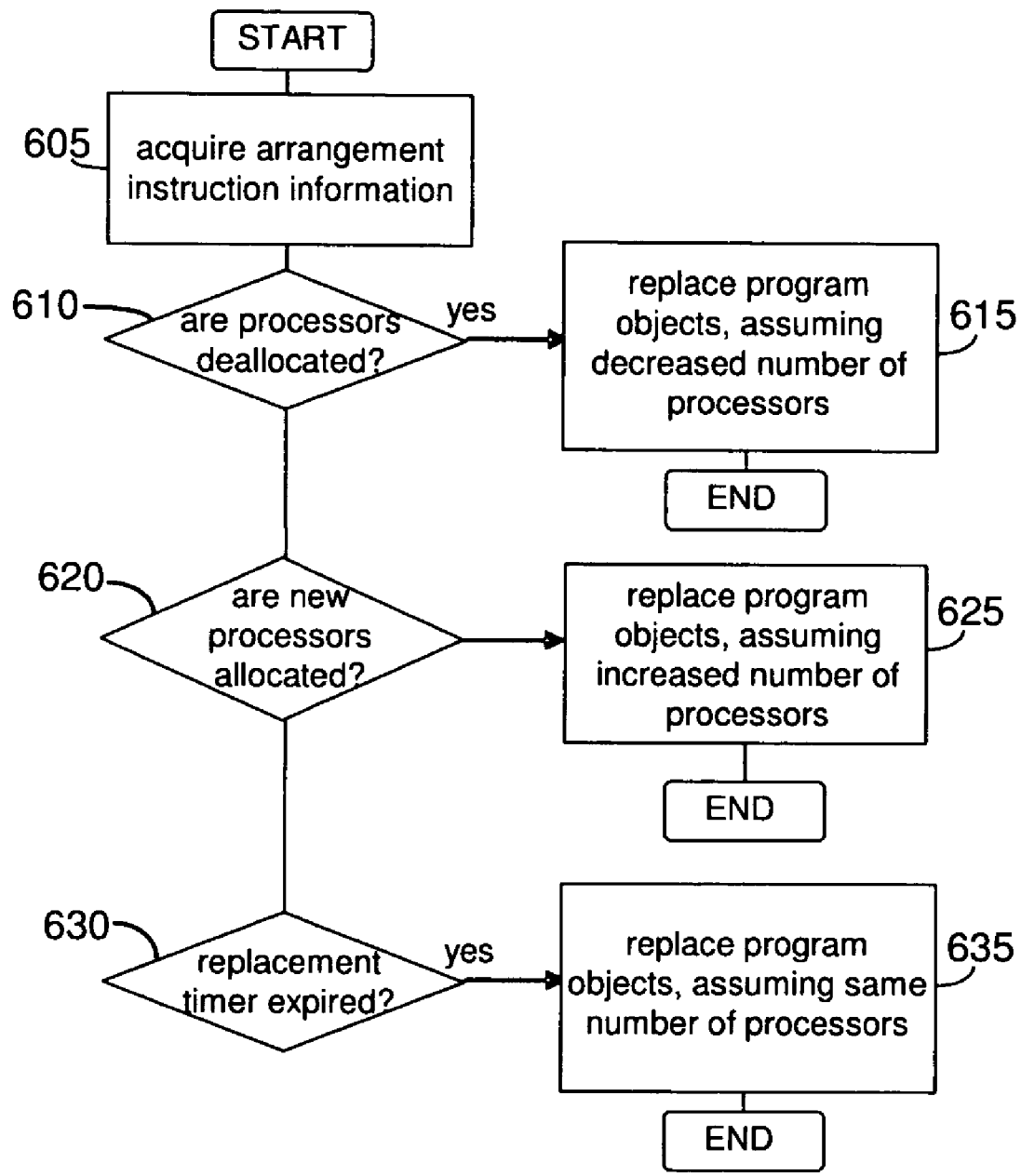
FIG. 6 is a flow diagram illustrating the replacement of currently executing configuration objects to conform a current set of configuration objects to a preferred set in accordance with one embodiment.

Referring to FIG. 6, a flow diagram illustrating the replacement of currently installed configuration objects to conform the current set of configuration objects to the preferred set in accordance with one embodiment is shown. As used herein, "conforming" the current set of configuration objects to the ratios of the preferred set means replacing configuration objects as necessary to best approximate the ratios of the preferred set of configuration objects. It should be noted that the number of available processors may not allow the exact ratios of the preferred set of configuration objects to be implemented. For example, in the example above, there should be twice as many instances of configuration object A than configuration object B. If there are four processors available to the application, it is clear that the exact 2:1 ratio (i.e., 67% object A and 33% object B) cannot be achieved. Object replacement component 233 may therefore select whichever of the configuration objects is deemed to achieve the best approximation of the ratios of the preferred set (e.g., configuration object A, which would result in a 3:1 ratio.)

The replacement of the currently installed configuration objects is based on the selection of preferred configuration objects generated by object selection component 232, so this information is obtained by object replacement component 233 (block 605.) In this embodiment, a determination is then made as to whether the number of processors available to the application has decreased (block 610.) If the number of available processors has decreased, object replacement component 233 determines how many of the reduced set of processors should be using each configuration object and replaces one or more of the currently installed configuration objects, if necessary, to achieve the desired configuration (block 615.)

If the number of processors available to the application has not decreased, it is determined whether this number has increased (block 620.) If the number of available processors has increased, object replacement component 233 determines how many of the increased set of processors should be using each configuration object (block 625.) Object replacement component 233 then installs appropriate ones of the configuration objects on the nearly available processor(s) and, if necessary, replaces one or more of the currently installed configuration objects to achieve the desired configuration (block 625.) If the number of processors available to the application has neither increased nor decreased, object replacement component 233 determines whether it is time for a periodic update of the configuration objects (block 630.) If it is time for a periodic update, object replacement component 233 determines whether one or more of the currently installed configuration objects should be replaced to achieve the desired ratio of configuration objects indicated by object selection component 232 and, if a replacement is necessary, the replacement is made (block 635.)

In one embodiment, object evaluation component 231 and object selection component 232 operate continually, while object replacement component 233 does not. In other words, object evaluation component 231 repeatedly measures the performance of the current set of configuration objects and provides this information to object selection component 232. Object selection component 232 continually maintains a list of preferred configuration objects based on this information and provides the list of preferred configuration objects to object replacement component 233. Object replacement component 233, however, does not continually update (replace) the current configuration objects with preferred configuration objects. To do so could involve so much overhead that the overall efficiency of the system would be reduced. Object replacement component 233 therefore makes replacements of the configuration objects more infrequently.

Referring again to FIG. 6, the flow diagram illustrates a process that is continually repeated. This process, however, does not result in a configuration object replacement each time it is performed. Instead, replacements may be performed when there is an interrupt indicating that the number of available processors has decreased (corresponding to block 610,) when there is an interrupt indicating that the number of available processors has increased (corresponding to block 620,) or when a timer indicates that a periodic update of the configuration objects should be performed at (see block 630.) It should be noted that "replacement," as used here, includes installing appropriate configuration objects on newly available processors. It should also be noted that it is not necessary to make a replacement each time an interrupt occurs or each time the timer expires. These are simply opportunities to make replacements and, if no replacements are necessary to bring the current set of configuration objects in line with the preferred set, no replacements need to be made.

Figure 11:
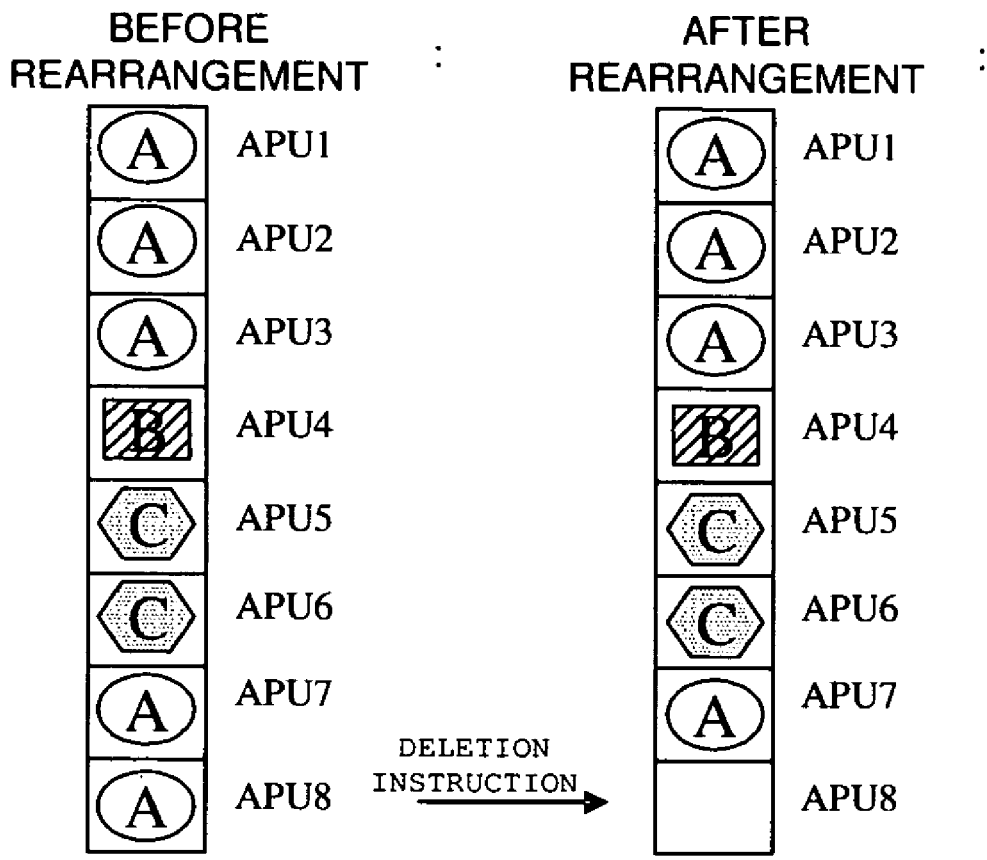
FIGS. 11-13 are diagrams illustrating the use of a diversity scheme as the object selection scheme.
Figure 12:
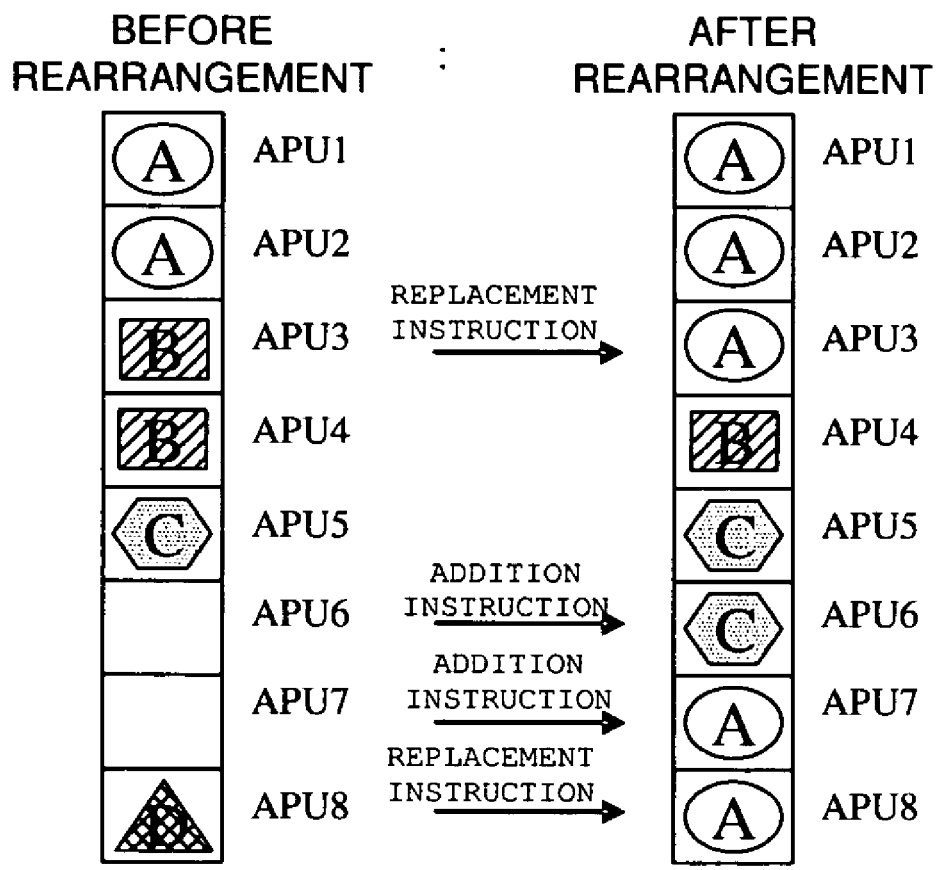
Figure 13:
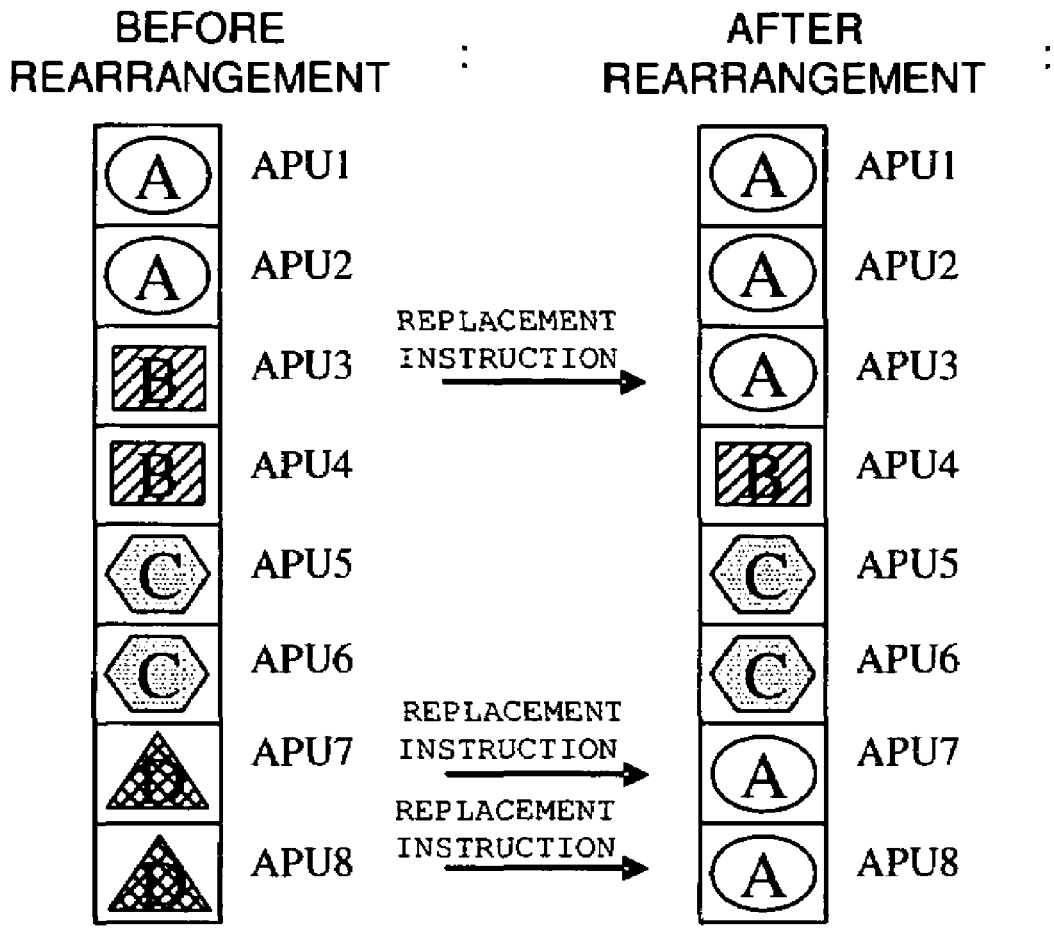

Referring to FIGS. 11-13, examples of the modification of the configuration objects executing on a set of available processors in accordance with one embodiment is shown. FIG.

11 corresponds to a situation in which one of the currently used processors is deallocated for use in executing a user application. FIG. 12 corresponds to a situation in which two additional processors are allocated for use in executing the user application. FIG. 13 corresponds to a situation in which processors are neither allocated nor deallocated, but a timer expires, causing a change in the configuration objects. For each of these figures, a diversification model is used, and the preferred set of configuration objects is identified by the ratios A:1.0, B:0.25, C:0.5, D:0.1.

Referring to FIG. 11, there are initially five instances of configuration object A, one instance of configuration object B and two instances of configuration object C executing on eight available processors. If one processor is deallocated (see block 610,) a change in the configuration objects is triggered, resulting in the deletion of configuration object A from one of the processors. The remaining configuration objects are in conformance with the ratios of the preferred set. Referring to FIG. 12, there are initially two instances of configuration object A, two instances of configuration object B, one instance of configuration object C and one instance of configuration object D executing on six available processors. If two additional processors are allocated (see block 620,) a change in the configuration objects is triggered. Two configuration objects (B and D) are replaced (by two instances of A) and two configuration objects (A and C) are added on the new processors. The resulting set of configuration objects conforms to the ratios of the preferred set. Referring to FIG. 13, there are initially two instances of each of configuration objects A, B, C and D. If no processors are allocated or deallocated, but a timer expires (see block 630,) the configuration objects are updated by replacing three configuration objects (B, D, D) with new configuration objects (three instances of A). The resulting set of configuration objects and then conforms to the ratios of the preferred set.

Differences Between Configuration Objects

Figure 7:
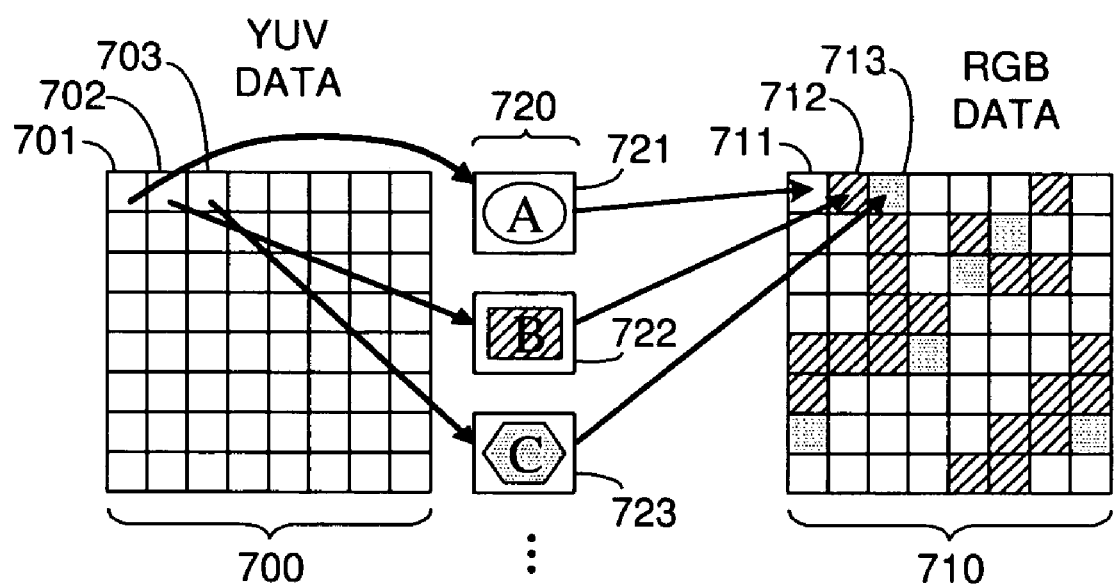
FIG. 7 is a diagram illustrating the exemplary scenario of processing of YUV data to produce RGB data.

The operation of a multiprocessor system in accordance with one embodiment is illustrated in the following exemplary scenarios. With respect to these scenarios, it may be helpful to first illustrate some of the potential differences between various configuration objects. Referring to FIG. 7, a diagram illustrating the processing of image data (conversion of YUV data to RGB data) is shown. YUV data is used for encoding analog and digital component video, where Y is the luminosity of the black and white signal, and U and V are color difference signals. RGB data is used for generating video on a display screen by displaying colors as red, green and blue dots of varying intensities.

In this scenario, YUV data 700 is processed by processors 720, which generate RGB data 710. As depicted in FIG. 7, YUV data block 701 is processed by processor 721 to generate RGB data block 711. Similarly, data block 702 is processed by processor 722 to generate RGB data block 712 and data block 703 is processed by processor 723 to generate RGB data block 713. When each of processors 721-723 finishes processing one of the data blocks, it retrieves another block of YUV data and begins processing the new data. This is repeated by each of the processors until all of the data is converted to RGB data.

Processors 721-723 each use a different configuration object to process the YUV data. Processor 721 uses configuration object A, while processors 722 and 723 use configuration objects B and C, respectively. Configuration objects A, B and C all perform a YUV-to-RGB data conversion, but perform this conversion in slightly different ways. For example, configuration object A may use a first data processing algorithm and a first internal data structure to perform the conversion. Configuration object B, on the other hand, may use a second algorithm and the first internal data structure. Configuration object C may use the first algorithm and a second internal data structure. As a result of these differences, the configuration objects may have different data processing efficiencies. It is assumed for the purposes of this example that configuration object A processes the data more quickly than configuration objects B and C. Configuration object A therefore processes a larger amount of the YUV data and generates a larger amount of the RGB data than configuration objects B and C. This is shown in figure by the shading of the RGB data blocks, which corresponds to the shading of the configuration objects illustrated in the processors.

This example illustrates only one of the potential performance differences (data processing speed) between various configuration objects. As indicated above, the configuration objects may perform differently in other respects as well. For example, if the processor using configuration object A above is operated at half of the clock speed of the processors using configuration objects B and C, all three of these processors may process the same amount of data, but the processor using configuration object A may consume only half of the power that is used by the other processors. In another example, the algorithms used by two different configuration objects may perform image processing with the same speed and power consumption, but one of the algorithms may produce a higher-quality output image than the other algorithm. There may be various other performance differences between configuration objects as well.

As indicated above, the performance of each of the configuration objects is measured by object evaluation component 231 using performance measurement component 331. Performance measurement component 331 may measure one or several metrics relating to the performance of each configuration object. These metrics may include, for example, the amount of data processed in a given amount of time, the amount of power used, the quality of the data processing, and so on. These metrics are evaluated according to a user profile model and an evaluation function model that are obtained from storage by evaluation function generation component 332. This process is illustrated in FIG. 8.

User Profile Model, Evaluation Function Model

Figure 8:
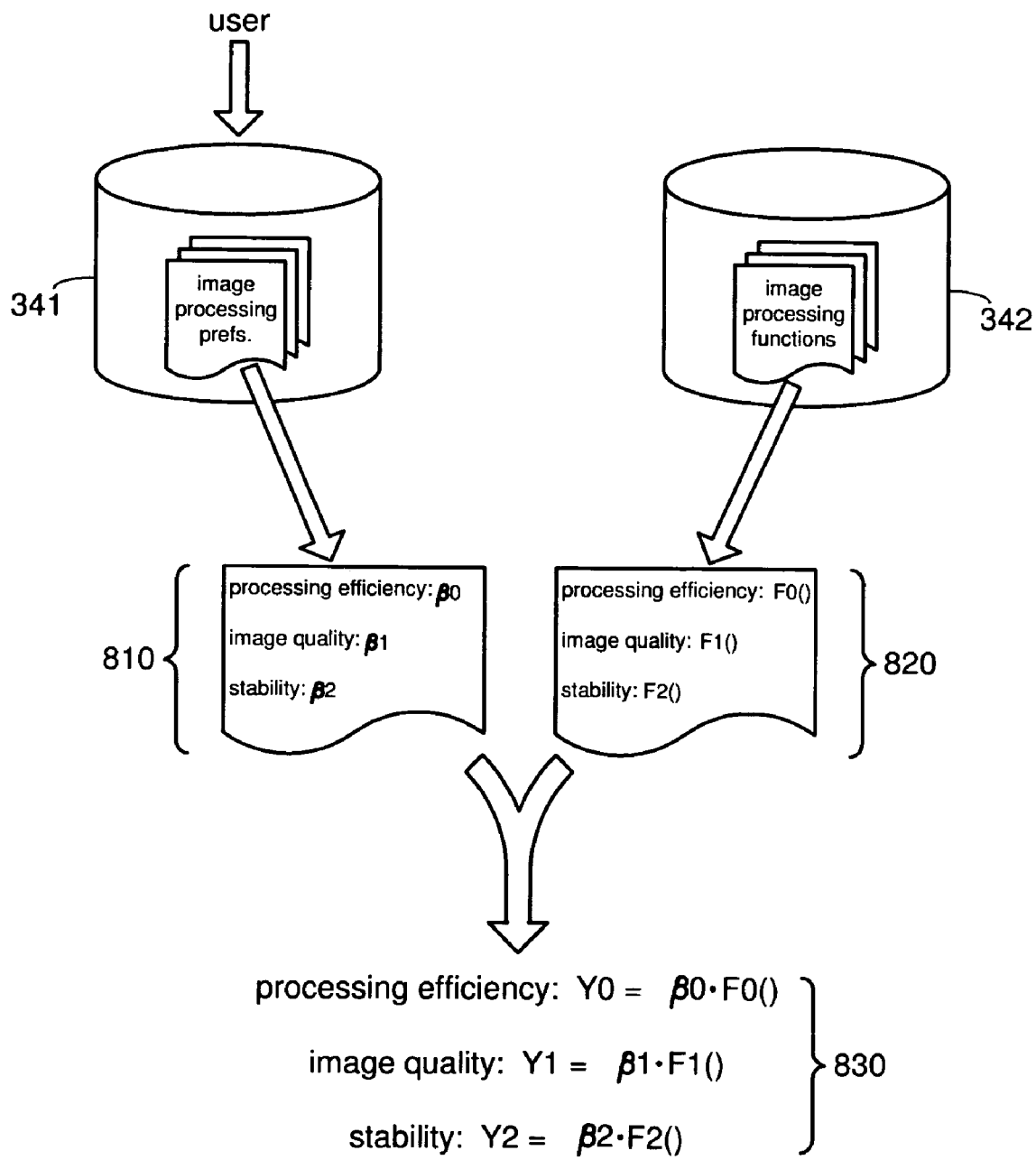
FIG. 8 is a diagram illustrating the implementation of a user profile model and an evaluation function model in the evaluation of performance metrics in accordance with one embodiment.

Referring to FIG. 8, a diagram illustrating the implementation of a user profile model and an evaluation function model in the evaluation of performance metrics is shown. One or more user profile models are stored in user profile model storage 341. This storage may consist of a disk drive or any other type of storage device suitable for storing profile model data. Similarly, one or more evaluation function models are stored in evaluation function model storage 342, which may be any type of storage device suitable for storing this data.

Each user profile model contains data indicating a user's preferences with respect to the performance of configuration objects installed on the multiprocessor system. These preferences may be more general, so that they apply to a broad range of configuration objects, or they may be more specific, so that particular preferences apply to particular types of configuration objects. In one embodiment, the user profile model contains separate preference data for different types of user applications or configuration objects, such as image processing applications, character recognition applications, voice-recognition applications, and so on.

Each evaluation function model includes functions that provide a basis for evaluating the performance of various types of configuration objects installed on the multiprocessor system. Like the user profile model data, these functions and may be generally applicable to different types of configuration objects, or they may be specific to particular types of configuration objects. In one embodiment, the evaluation function model includes separate evaluation functions for different types of configuration objects (e.g., image processing objects, character recognition objects, voice-recognition objects, etc.) While the level of generality or specificity of the evaluation functions with respect to particular types of configuration objects is the same as the level of generality or specificity of the corresponding user preferences in this embodiment, this is not necessarily the case in alternative embodiments.

In the embodiment of FIG. 8, there is a correspondence between the evaluation functions of the evaluation function model and the user preferences of the user profile model. In other words, for each evaluation function in the evaluation function model, there is a corresponding user preference in the user profile model. Thus, there is a set of image processing evaluation functions and a corresponding set of image processing preferences. The same is true of other types of user applications and configuration objects as well. As noted above, the user preferences provide a mechanism for weighting the evaluation functions. Depicted in the figure are three user preferences (see 810) and three corresponding evaluation functions (see 820) for an image processing-type application. Each of these user preferences is a value, $\beta n$, typically falling between some minimum and maximum values, corresponding to the importance of the corresponding evaluation function, Fn( ). $\beta n$ may, for example, comprise a discrete threshold value within this range. This value is multiplied by the corresponding evaluation function to generate a weighted evaluation function (see 830.) In one embodiment, the evaluated values (Yn) of the different functions are added to produce an aggregate evaluation result. This evaluation result can then be provided to object selection component 232.

In one embodiment, the user profile model specifies not only the weighting to be used with the evaluation functions, but also threshold levels of acceptable performance. In this embodiment, configuration object evaluation component 231 evaluates each of the weighted evaluation functions and compares the evaluated values of the functions to user-specified threshold values. This comparison may be performed either at the level of the individual functions, or at the aggregate level. Object evaluation component 231 may then provide to object selection component 232 an indication of whether or not each configuration object is performing at an acceptable level (either with respect to individual functions or in the aggregate,) as well as the evaluation values. The indication of acceptable performance may be used, with or without the aggregate evaluation value, to determine which of the configuration objects are selected to be in the preferred set of configuration objects.

It should be noted that, in various embodiments, the evaluations of the configuration objects may proceed in different ways. For example, in one embodiment, a single evaluation function based on a single performance metric (e.g., power efficiency) may be used to determine the performance of each of the configuration objects, while in another embodiment, multiple evaluation functions based on multiple performance metrics and (e.g., power efficiency, data processing efficiency, output data quality, etc.) may be used. If multiple evaluation functions are used, the results of these functions may be separately considered, or they may be combined (e.g., by summing the results to produce a single evaluation value.) The evaluations of the configuration objects may also take into account the performance history of the configuration objects. In other words, rather than using an evaluation value based on a particular time interval, this value may be combined with performance evaluation values from previous intervals (e.g., by summing or averaging the evaluation values over the last n intervals.) Still other variations are also possible.

Selection Schemes

In addition to the variations in the evaluation scheme, there may be variations in the scheme for selecting the preferred set of configuration objects. For example, one scheme for selecting the preferred set of configuration objects is simply directed to selecting the objects that provide the best performance. This scheme is referred to herein as a "unification" scheme. In the unification scheme, the preferred set of configuration objects consists only of the configuration object with the best performance. Thus, if there are four configuration objects, A-D, and configuration object A has the best performance, the ratios of configuration objects A-D would be 1, 0, 0, 0, respectively. If configuration object C had the best performance, the ratios of the preferred set would be 0, 0, 1, 0, respectively, for configuration objects A-D.

Another object selection scheme is directed to obtaining diversity in the preferred set of configuration objects (and is therefore referred to herein as a "diversity" scheme.) According to this scheme, the preferred set of configuration objects should not include only a single one of the available configuration objects. Instead, it is desired to include more than one type of configuration object (i.e., a diversity of objects.) This may be desirable in some instances because of the possibility that the type of data which is being processed may change, and the diversity of configuration objects will lessen the impact of this change on the overall performance of the system. For example, if the application is a DVD player and the data being processed is an action movie, the scenes may at first change very slowly (e.g., when one character is sneaking up on another,) so that a first configuration object optimized for slowly changing data has the best performance. If the scenes then begin to change rapidly (e.g., when a gunfight breaks out,) a second configuration object optimized for rapidly changing data may have better performance. Thus, it may be desirable to have a diverse set of configuration objects and sacrifice a small amount of performance with the current data type in order to have less degradation in the overall performance of the system when the data type changes.

These object selection schemes are based upon individual evaluations of the different configuration objects. Another set of object selection schemes may be based upon comparative evaluations of the configuration objects. In other words, the selection schemes may take into account not only which of the configuration objects are the best (and possibly worse) performers, but also how the configuration objects' performance levels compare to each other. In one such set of object selection schemes, a similarity determination is made for each pair of configuration objects, and this information is used in the selection of the preferred set. This similarity determination is referred to above in connection with FIG. 5.

A "similarity" strategy may be implemented to provide object selection schemes that are less "black-and-white" than the simple strategy described above (e.g., where the unification scheme includes only a single configuration object in the preferred set.) Using a similarity strategy, the performance of each of the configuration objects is evaluated, and the performance of each configuration object is compared to each of the other configuration objects to determine the similarity of the pair. This similarity metric is then taken into account when selecting which configuration objects should be in the preferred set. For example, if a diversity-type scheme is desired to minimize the impact of changing data types on the performance of the system, the similarity metric provides an indication of how much diversity there is in the preferred set of configuration objects. The configuration object selection scheme may therefore involve identifying a first configuration object having the best performance, then selecting a second configuration object that is least similar to the first. It may also be desirable to include another configuration object that is more similar to the first object, thereby providing more of a spectrum of configuration objects (as opposed to including only those configuration objects with the best and worst performance.)

Replacement Schemes/Strategies

There may also be variations in the manner in which configuration objects are replaced in the different embodiments. As noted above, one embodiment is configured to determine whether or not to replace configuration objects in the current set periodically or in response to receiving certain interrupts. The determination as to whether a particular configuration object in the current set will be replaced is based upon an examination of the ratios defining the preferred set and a determination of which configuration objects can be replaced to more closely conform the current set to the preferred set. Clearly, different algorithms may be used in different embodiments to determine what is the most closely conforming set of configuration objects. Other embodiments may have variations such as performing configuration object replacements only when interrupts are received, or only periodically. In other embodiments, the periodicity with which replacements are performed may be adjusted based upon the history of the replacements that have already been made. For example, if, at a certain periodicity, a certain number of configuration objects are always replaced, the periodicity may be adjusted downward so that the opportunity to perform replacements occurs more frequently. On the other hand, if at a certain periodicity, replacements are rarely made, the periodicity may be adjusted upward to reduce the processing power that is consumed by the process.

Another variation relating to the object replacement component of the system concerns adjustment of additional configuration parameters, aside from simple replacement of software such as video decoders. In one embodiment, if the performance of a particular configuration object is evaluated to be significantly higher than is necessary to meet a minimum performance threshold, the system's replacement component may determine that this configuration object can be used by one or more of the processors at a reduced clock rate. By reducing the clock rate, the power consumption of the processor can also be reduced. The replacement component may therefore reduce the clock rate of a processor that is already using this configuration object, or it may replace other configuration objects with this configuration object and reduce the clock rates of the corresponding processors.

Network-Based Retrieval of New Configuration Objects

In the embodiments described above, the system (particularly the object evaluation and object selection components) operates based on a locally available set of configuration objects. In other words, these configuration objects are stored on the system and are ready to be installed on the processors. In one alternative embodiment, the system is coupled to an external network, such as the Internet, and has access to remotely stored configuration objects. The operation of the system is therefore not limited to evaluation and selection of a limited number of configuration objects that are stored locally on the system. In this alternative embodiment, the system may periodically search for configuration objects that are available through the network and may consider these configuration objects in the selection of the preferred set and replacement of current configuration objects.

Figure 9:
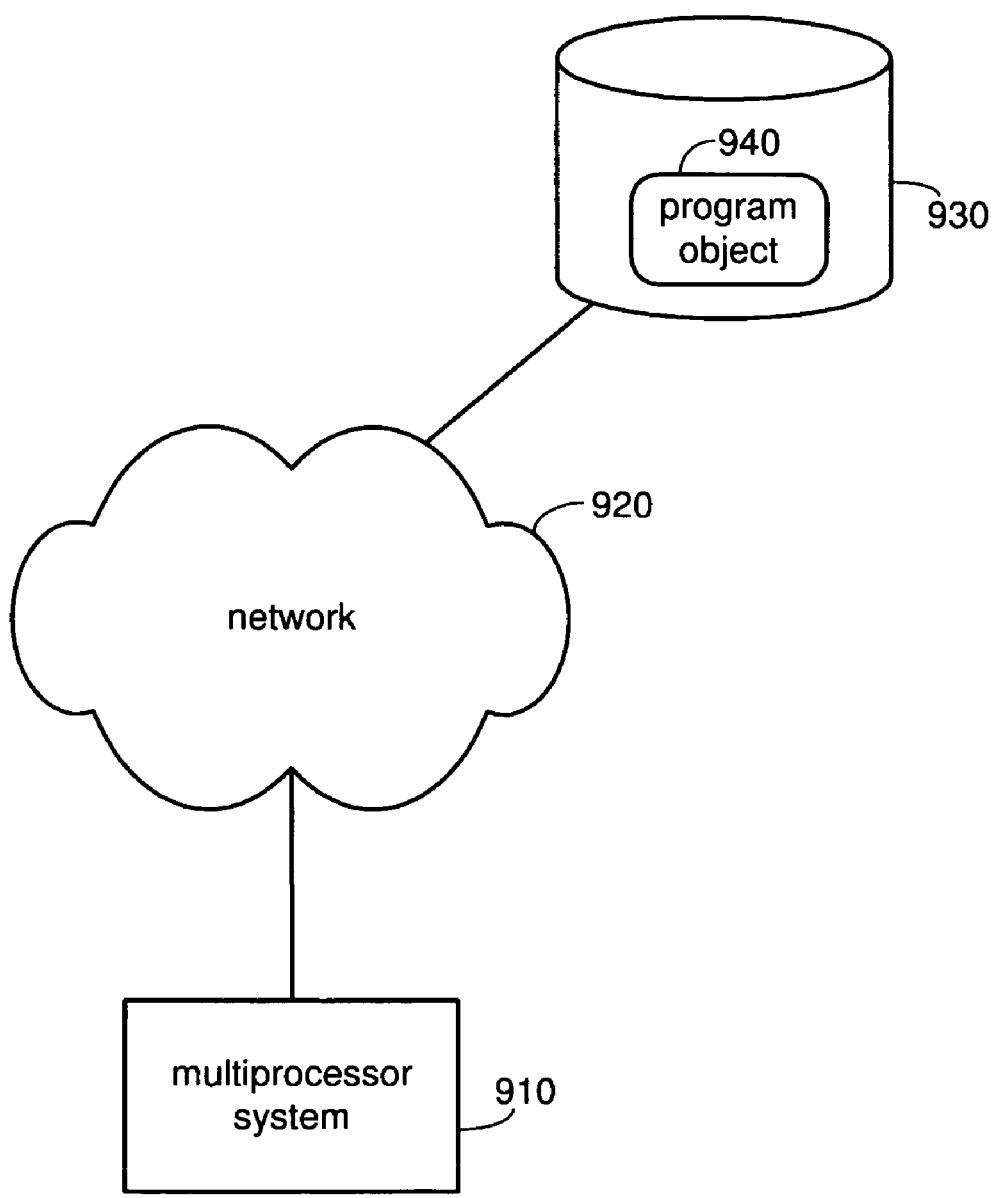
FIG. 9 is a diagram illustrating the structure of a system that can use remotely stored, network accessible configuration objects in accordance with one embodiment.

Referring to FIG. 9, a diagram illustrating the structure of a system that can use remotely stored, network accessible configuration objects in accordance with one embodiment is shown. In this embodiment, system 910 operates in the same manner as the systems described above in most respects. System 910, however, is coupled to a remote server 930 via external network 920. System 910 can therefore access server 930 and retrieve configuration objects 940 that are stored on the server. Configuration objects 940 are stored with information that identifies one or more performance characteristics of the configuration objects. These performance characteristics are, in this embodiment, essentially equivalent to the performance evaluation metrics that are provided by object evaluation component 231 of system 200, except that the performance information is stored instead of measured. The object selection component of system 910 is configured to examine configuration objects 940 and the corresponding performance characteristics and to determine whether, based upon these performance characteristics, it would be useful to include remote configuration objects 940 in the object selection process. If this determination is positive, the remote configuration objects may be retrieved and considered in the same manner as the local configuration objects.

Testing of New Configuration Objects

In an embodiment such as that shown in FIG. 9, the source of the configuration objects (e.g., server 930) may not be known to the system. Consequently, the performance of the new configuration objects may not be known with certainty. It may therefore be desirable to provide a mechanism for verifying the performance of the new configuration objects. One possible mechanism for verifying the performance of these configuration objects is shown in FIG. 10.

Figure 10:
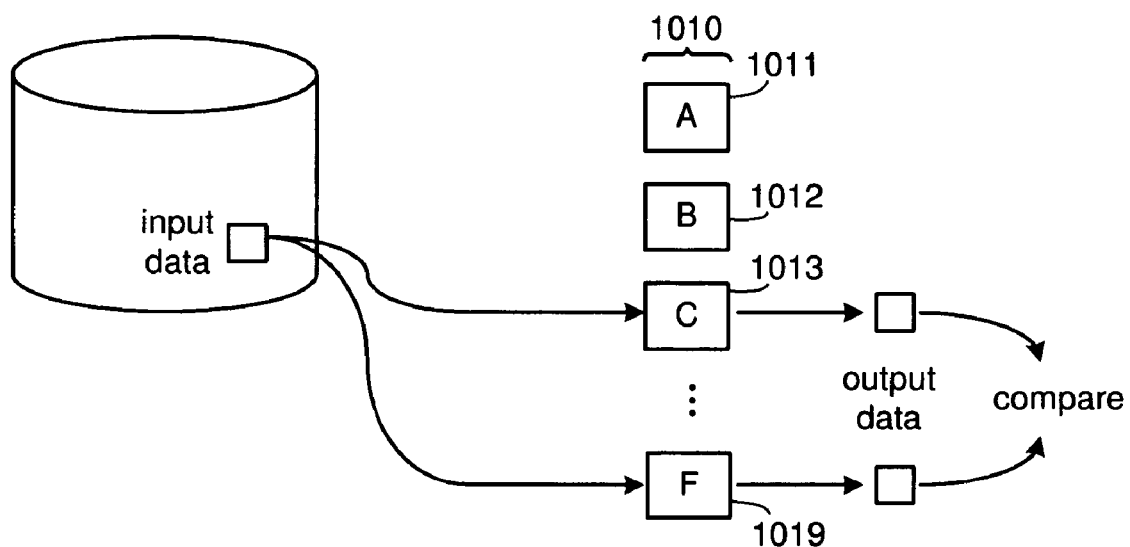
FIG. 10 is a diagram illustrating a mechanism for verifying that performance of an unknown or untrusted configuration object in accordance with one embodiment.

Referring to FIG. 10, a diagram illustrating a mechanism for verifying that performance of an unknown or untrusted configuration object in accordance with one embodiment is shown. In this embodiment, the individual processors 1010 of a multiprocessor system retrieve input data, process the input data and provide output data generally as described in connection with the foregoing embodiments. All of processors 1010 except one, 1019, use trusted configuration objects. The last processor, 1019, uses the new and unknown/untrusted configuration object. Processor 1019 receives blocks of data that are identical to the data received by one of the other processors (in this case, 1013.) Both processor 1013 and processor 1019 process this data and generate corresponding output data. The output data of processor 1019 is not stored with the data output by the other processors, but is instead simply used for purposes of a comparison. The data produced by processor 1019 (which is using the unknown/untrusted configuration object) is compared to the data produced by processor 1013 (which is using a known/trusted configuration object.) If the output data of processor 1019 is the same as the data produced by processor 1013, then the new configuration object is trusted. If the data is not the same, then the new configuration object is not trusted. It should be noted that, just as two different trusted configuration objects may generate output data that is not identical (e.g., they may produce output images of different qualities,) the output of the new configuration object may not be identical to that of the trusted configuration object. If the expected output of the new configuration object is not known, it may be necessary to make allowances for such differences.

Those of skill will appreciate that the various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of methods described in connection with the embodiments disclosed herein may be embodied directly in hardware, in software (program instructions) executed by a processor, or in a combination of the two. Software may reside in RAM memory, flash memory, ROM memory, EPROM memory, EEPROM memory, registers, hard disk, a removable disk, a CD-ROM, or any other form of storage medium known in the art. An exemplary storage medium is coupled to a processor such the processor can read information from, and write information to, the storage medium. In the alternative, the storage medium may be integral to the processor. The processor and the storage medium may reside, for example, in an ASIC. The ASIC may reside in a user terminal. The processor and the storage medium may alternatively reside as discrete components in a user terminal or other device.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A method implemented in a system having a plurality of processors embedded in a general purpose processor, wherein each of the processors is implemented in an integrated circuit and has a corresponding configuration object installed thereon, and wherein each configuration object is composed of programming that is installed on the corresponding processor to enable the processor to assist in the execution of a user application, the method comprising:
    (a) evaluating performance of each configuration object of a current set of the configuration objects installed on the plurality of processors;
    (b) selecting a preferred set of configuration objects based on the evaluated performance of the configuration objects in the current set; and
    (c) replacing one or more of the configuration objects in the current set to conform the current set to the preferred set, wherein replacing one or more of the configuration objects in the current set comprises replacing a first configuration object having a lower data processing efficiency with a second configuration object having a higher data processing efficiency, the method further comprising reducing a clock rate of the processor on which the second configuration object is installed in response to replacing the first configuration object with the second configuration object.

2. The method of claim 1, wherein selecting the preferred set of configuration objects comprises selecting a set of configuration objects that has performance which is at least as good as the performance of the current set of configuration objects.

3. The method of claim 2, wherein the performance of the configuration objects is determined at least in part based upon power efficiency.

4. The method of claim 2, wherein the performance of the configuration objects is determined at least in part based upon data processing efficiency.

5. The method of claim 1, wherein evaluating performance of each of the current set of configuration objects is performed using modifiable criteria.

6. The method of claim 5, wherein the modifiable criteria comprise user preferences which weight corresponding performance metrics.

7. The method of claim 6, wherein the user preferences comprise one or more discrete values corresponding to one or more associated evaluation functions.

8. The method of claim 5, wherein the modifiable criteria comprise at least one evaluation function.

9. The method of claim 1, wherein evaluating performance of each of the current set of configuration objects comprises measuring at least one performance metric.

10. The method of claim 9, wherein the at least one performance metric comprises power consumption.

11. The method of claim 1, wherein selecting the preferred set of configuration objects comprises selecting an object selection strategy and selecting the preferred set of configuration objects in accordance with the object selection strategy.

12. The method of claim 11, wherein the object selection strategy comprises a diversity strategy.

13. The method of claim 1, wherein (a)-(c) are performed while all of the plurality of processors are processing data in accordance with a single user application.

14. The method of claim 1, further comprising examining performance metrics associated with one or more configuration objects which are stored remotely from the system and including one or more of the remotely stored configuration objects in the preferred set.

15. The method of claim 14, wherein the remotely stored configuration objects and associated performance metrics are stored on a remote server that is accessible via a network external to the system, the method further comprising accessing the remotely stored configuration objects and associated performance metrics via the network.

16. The method of claim 15, further comprising replacing one or more of the configuration objects in the current set with one or more of the remotely stored configuration objects.

17. The method of claim 15, further comprising testing at least one of the remotely stored configuration objects by processing a block of data using the remotely stored configuration object, processing the block of data using a trusted configuration object, and comparing output data generated using the remotely stored configuration object to output data generated using the trusted configuration object to determine whether the remotely stored configuration object generates output data comparable to the trusted configuration object.

18. The method of claim 1, further comprising identifying each configuration object in the preferred set and corresponding ratios in which the each of the configuration objects in the preferred set are to be executed.

19. The method of claim 1, wherein replacing one or more of the configuration objects in the current set is performed in response to allocation of at least one additional processor.

20. The method of claim 1, wherein replacing one or more of the configuration objects in the current set is performed in response to deallocation of at least one of the plurality of processors.

21. The method of claim 1, wherein replacing one or more of the configuration objects in the current set is performed in response to expiration of a timer.

22. A system comprising:
a plurality of processors embedded in a general purpose processor, wherein each of the processors is implemented in an integrated circuit; and
an object manager configured to
evaluate performance of each configuration object of a current set of configuration objects installed on the plurality of processors, wherein each configuration object is composed of programming that is installed on the corresponding processor to enable the processor to assist in the execution of a user application,
select a preferred set of configuration objects based on the evaluated performance of each configuration object, and
replace one or more of the configuration objects in the current set to conform the current set to the preferred set,
wherein the object manager is configured to replace a first configuration object having a lower data processing efficiency with a second configuration object having a higher data processing efficiency, and to reduce a clock rate of the processor on which the second configuration object is installed in response to replacing the first configuration object with the second configuration object.

23. The system of claim 22, wherein the object manager is configured to select as the preferred set of configuration objects a set that has performance which is at least as good as the performance of the current set.

24. The system of claim 23, wherein the object manager is configured to determine the performance of the configuration objects at least in part based upon power efficiency.

25. The system of claim 23, wherein the object manager is configured to determine the performance of the configuration objects at least in part based upon data processing efficiency.

26. The system of claim 22, wherein the object manager is configured to evaluate performance of each of the current set of configuration objects using modifiable criteria.

27. The system of claim 26, wherein the modifiable criteria comprise user preferences which weight corresponding performance metrics.

28. The system of claim 27, wherein the user preferences comprise one or more discrete values corresponding to one or more associated evaluation functions.

29. The system of claim 26, wherein the modifiable criteria comprise at least one evaluation function.

30. The system of claim 29, wherein the modifiable criteria comprise a plurality of evaluation functions.

31. The system of claim 22, wherein the object manager is configured to evaluate performance of each of the current set of configuration objects by measuring at least one performance metric.

32. The system of claim 31, wherein the at least one performance metric comprises power consumption.

33. The system of claim 22, wherein the object manager is configured to choose an object selection strategy and select the preferred set of configuration objects in accordance with the object selection strategy.

34. The system of claim 33, wherein the object selection strategy comprises a diversity strategy.

35. The system of claim 22, wherein the object manager is configured to perform the evaluation, selection and replacement while all of the plurality of processors are processing data in accordance with a single user application.

36. The system of claim 22, wherein the object manager is configured to examine performance metrics associated with one or more remotely stored configuration objects and include one or more of the remotely stored configuration objects in the preferred set.

37. The system of claim 36, wherein the object manager is configured to access the remotely stored configuration objects and associated performance metrics via a network external to the system.

38. The system of claim 37, wherein the object manager is configured to replace one or more of the configuration objects in the current set with one or more of the remotely stored configuration objects.

39. The system of claim 37, wherein the object manager is configured to test at least one of the remotely stored configuration objects by processing a block of data using the remotely stored configuration object, processing the block of data using a trusted configuration object, and comparing output data generated using the remotely stored configuration object to output data generated using the trusted configuration object to determine whether the remotely stored configuration object generates output data comparable to the trusted configuration object.

40. The system of claim 22, wherein the object manager is further configured to identify each configuration object in the preferred set and corresponding ratios in which the each of the configuration objects in the preferred set are to be executed.

41. The system of claim 22, wherein the object manager is further configured to replace one or more of the configuration objects in the current set in response to allocation of at least one additional processor.

42. The system of claim 22, wherein the object manager is further configured to replace one or more of the configuration objects in the current set in response to deallocation of at least one of the plurality of processors.

43. The system of claim 22, wherein the object manager is further configured to replace one or more of the configuration objects in the current set in response to expiration of a timer.

44. The system of claim 22, wherein the plurality of processors are implemented in a multiprocessor of a consumer electronics device.

45. The system of claim 44, wherein the multiprocessor comprises a multimedia processor configured to process multimedia data for presentation to a user.

46. The system of claim 44, wherein the multiprocessor is implemented in a single integrated circuit.

47. The system of claim 22, wherein each configuration object comprises programming that is installed on a corresponding one of the processors, wherein the programming affects a manner in which data is processed by the processor.

48. The system of claim 47, wherein at least one of the configuration objects comprises a data processing algorithm.

* * * * *